Nov. 16, 1926.

C. L. KEY

WEEDER

Filed March 24, 1925  2 Sheets-Sheet 1

1,607,129

INVENTOR.
CLAUDE L. KEY
BY
ATTORNEY.

Nov. 16, 1926.
C. L. KEY
1,607,129
WEEDER
Filed March 24, 1925    2 Sheets-Sheet 2
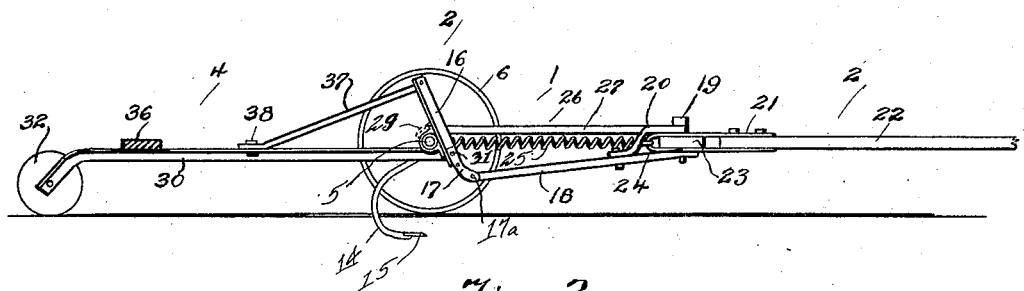
Fig. 3
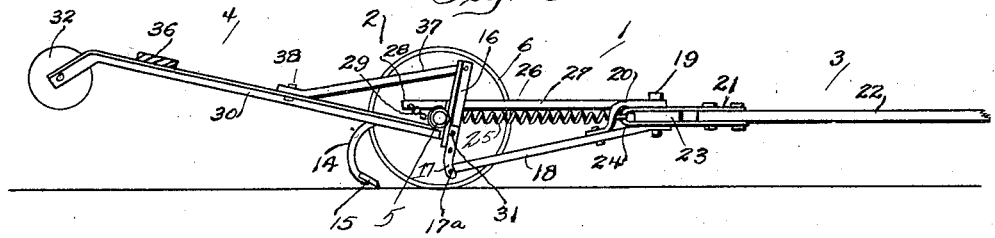
Fig. 4
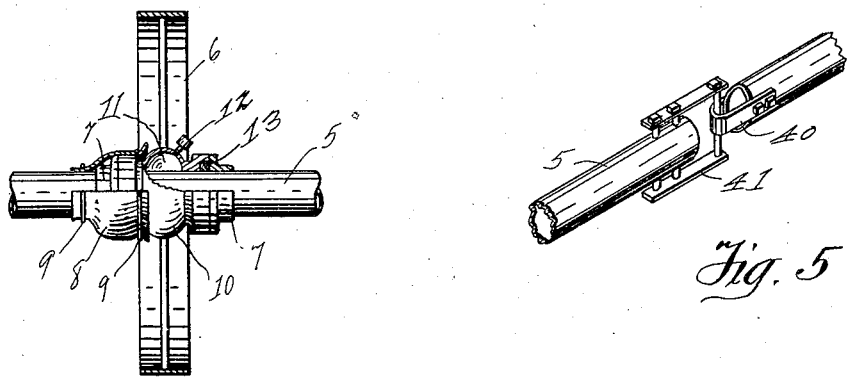
Fig. 6
Fig. 5
INVENTOR.
CLAUDE L. KEY
BY
ATTORNEY.

Patented Nov. 16, 1926.

1,607,129

UNITED STATES PATENT OFFICE.

CLAUDE L. KEY, OF MILTON, OREGON.

WEEDER.

Application filed March 24, 1925. Serial No. 17,872.

This invention relates to weeders and has as one of its objects to provide a weeder having a semi-automatic means for cleaning the blade of weeds.

Another object of the invention is to provide a weeder that may be easily adjusted as to cutting depth, and maintained rigidly in the cutting position.

A further object of the invention is to provide a weeder that may be operated as a single section and that is equally applicable for use when coupled with other sections.

A further object of the invention is to provide a weeder that may be mounted on wheels to afford light draft, and having a draft device that is an essential part of its operating mechanism.

A further object of the invention is to provide a weeder whose blade may be cleaned with or without stopping the machine, and without leaving a "skip", or uncleaned portion of the soil.

A further object of the invention is to provide a weeder that has light draft and that is easy to operate.

With these and other objects in view reference is now had to the accompanying drawings in which—

Fig. 3 is a similar view to Fig. 2 but showing the blade adjustment;

Fig. 4 is a similar view to Fig. 2 but showing the weeder in a position for cleaning the blade;

Fig. 5 shows a perspective view of details of the coupling used to join two sections together; and Fig. 6 is a front sectional view of the wheel assembly.

Figure 1:
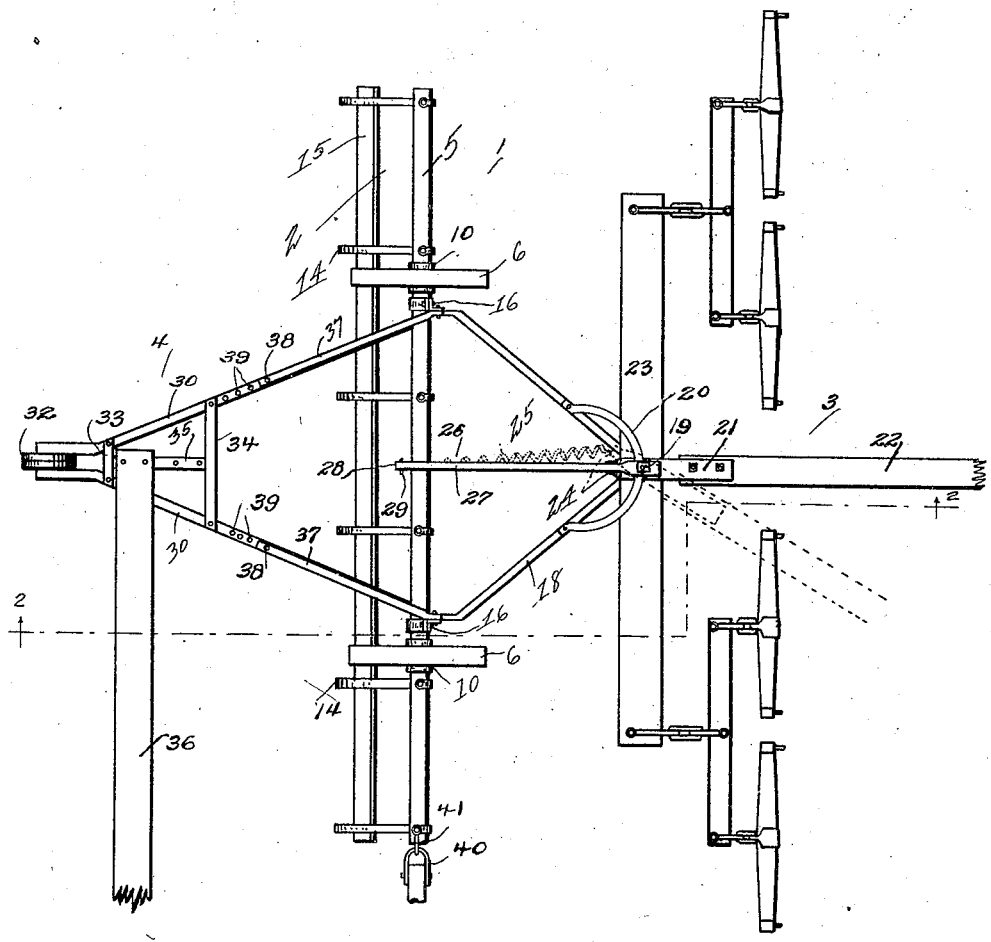
Fig. 1 is a plan view of the weeder, and shows the method of connecting one section with another when two sections are used together.
Figure 2:
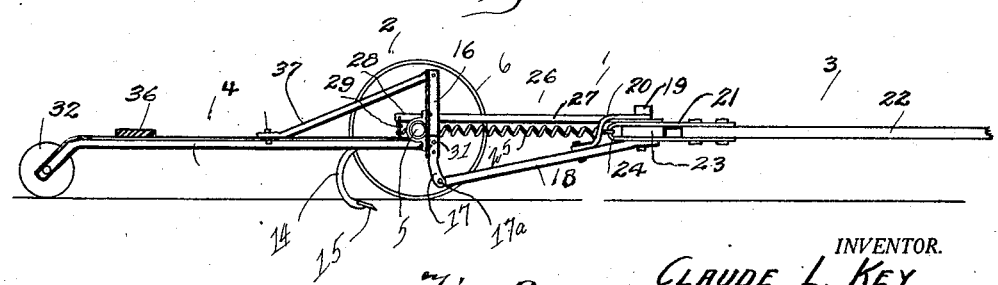
Fig. 2 is a section on the line 2—2 of Fig. 1.

Having reference to the drawings like numerals refer to like parts throughout the several views and the numeral 1 refers to the weeder which is composed in a general way of a beam section 2, a draft device 3, and a trailer 4.

Specifically the beam section comprises a beam 5 which is extended the full length of the section and is preferably of tubular cross section, as shown plainly in the perspective view of Fig. 5.

The beam is horizontally supported by wheels 6, or other means, and these are spaced apart to support the beam in a generally parallel position with respect to the surface of the ground over which it travels.

The wheels are mounted on the beam and rotate between collars 7 that are secured to the beam in any suitable manner, and which hold the wheels in their proper place on the beam.

As there is much dust arising during the operation of the weeder a cover 8 is provided to cover the bearing portion of the wheel, and the cover is tightly fastened to the beam by a cord or wire 9 and is loosely drawn in about the hub 10 by a similar wire in a manner to permit the wheel to rotate without affecting the cover.

The hub is hollow, as at 11, and a grease cup 12 is provided wherewith to keep the hub filled with grease, and a felt gasket 13 is added between the collar and the hub to prevent the exudation of the grease.

Rigidly attached to the beam 5 are goosenecks 14 which carry a cutting blade 15 in a position parallel to the beam and the goosenecks are so designed as to position the blade a distance from the beam that when the blade is directly beneath the beam, as shown in Fig. 3, it will be at its maximum cutting distance in the soil.

The beam is rotatable under certain conditions to be hereinafter explained, and the blade being rigidly attached to the beam will rotate with it.

The rotation may occur when adjusting the blade for depth, adjustment consisting of moving the blade forward in an arc about the beam until the proper depth is obtained, or rotation may occur when cleaning the blade, the latter operation consisting of moving the blade backward through the soil, ultimately bringing it out of the soil if necessary.

Rigidly attached to the beam, preferably adjacent to the wheels are uprights 16, and these uprights extend above and below the center of the beam and have their lower ends 17 advanced off center, i. e. on about a quarter of a circle, in a position approximately perpendicular to the rearwardly extending bars 18 of the draft device 3, with which bar the end 17 is pivotally connected at the pivotal point 17ª.

The purpose of this advance of the pivotal point is to provide for ample throw of the upright, and as this principle is well known in the art further description is deemed unnecessary.

The draft means 3 consists of bars 18 that extend rearwardly to pivotally engage the lower end of the uprights, as above mentioned, and these bars meet at a common center to be engaged at that point by a king bolt 19.

The bars carry a guard 20 through which the king bolt likewise passes to movably secure the iron 21, that in turn carries the tongue 22 and evener 23, and provides for a free lateral movement of the tongue, as shown by the dotted lines in Fig. 1.

Attached preferably to the rear curved part 24 of the iron 21 is a spring 25 having its rear end connected to the central part of the beam 5 in any suitable manner (not shown).

The spring is attached to the draft means and weeder in a manner tending to advance and rotate the beam about the above mentioned pivotal point, and accomplishes this by drawing the beam toward the tongue, by the tension of the spring.

It is now obvious that rotating the beam will also rotate the blade 15, the latter being rigidly attached to the beam, and by advancing the beam on the pivotal point by a strong spring tension that the blade will move backward from its greatest maximum depth directly beneath the beam, to a position to the rear of the beam as shown in Fig. 4, where it is out of the soil entirely, and it is also obvious that with a light spring tension, and by forcing the pivotal point backward, as by backing the team, that the blade will be drawn out of the soil in a similar manner, with the exception however, that in the first instance the point of entry of the blade will be slightly in advance of the point of exit, while in the second instance the point of entry will be slightly behind the point of exit as the resistance offered to the rotation of the beam by the soil will cause the position of the beam to change slightly to the rear in a manner that is well understood.

To limit the rotative movement of the blade a stop 26 is provided and this stop consists of a bar 27 that extends backward from the draft means to rest on the beam, with its rear end 28 extended beyond the beam in a manner to be flexibly connected thereto by a chain 29 or the like. By this means and adjusting the length of the chain, the movement of the blade may be arrested at any predetermined point by stopping the advance movement of the beam.

The movement of the blade is further regulated by means of the trailer 4 which is rigidly and adjustably attached to the beam by means of uprights 16 and comprises bars 30 having one of their ends pivotally attached to the uprights at the point 31, and the other ends bent to accommodate a trailer wheel 32, the latter comprising preferably a wooden wheel constructed of two pieces of planking placed together with their grain crossed to provide strength with lightness. Obviously the wheel may be a caster wheel if desired, but this is not necessary as will be explained.

Braces 33 and 34 respectively add strength to the bars 30 and provide for a support 35 that is secured to these braces, and the support carries a riding platform 36 that may be positioned forward or back on the support as required by the density of the soil, light soil requiring that the platform be advanced to reduce the weight on the wheel 32.

The trailer is also provided with an adjusting means comprising diagonal bars 37 that are adjustably attached to the bars 30 by means of bolts 38 adapted to engage the bolt holes 39 in the bars, and have their upper ends secured to the top of the uprights.

With this means, and by the adjustment of the diagonal bars, the normal depth of the blade may be regulated.

It will now be seen that with a spring 25 having sufficient strength, and the weight of the draft means being greater than the trailer, the trailer will be raised from the ground under normal conditions by the tension of the spring, but that with the weight of the operator on the platform the effect of the spring will be counteracted and that the blade will remain in the soil until the weight is removed from the platform.

It will also be seen that with the spring merely counterbalancing the weight of the trailer that the blade will remain in the ground without the weight of the operator, and that under these conditions backing the team will force the blade out of the ground.

It is now obvious that this action will prevail whether the weeder is constructed of one or a plurality of sections, and while what I claim will cover a single section the application of this principle to a plurality of sections joined together will not depart from the spirit of the invention.

Where the sections are combined each section will have its own draft power and this power will preferably be under a single control, by an operator who will have a position on the running platform between the two sections, the two ends of the platform being supported in this case by the respective trailers.

Where a single section is used the platform will obviously be shorter, the object of the platform being merely for the operator to stand on.

It will be noted in the drawings that the trailer wheel is of small diameter and that this enables the platform to be placed close to the ground to provide for ease in mounting.

Where two sections are used the beams are joined together by means of a coupling consisting of a narrow loop 40 rigidly attached to the end of one beam and positioned horizontally, and a wide clevis 41 rigidly attached to the end of the second beam and positioned vertically to engage the loop, which coupling will provide for freedom of movement in a vertical direction of the two beams.

In use the blade is adjusted as to depth of cut by means of the diagonal bars 37 on the trailer. The stop is then adjusted so that the blade may be withdrawn to any predetermined point.

With these adjustments made the weeder is moved to the field to be cut, the trailer being permitted to assume the position shown in Fig. 4 during movement, to bring the blade free of the ground.

The operator now mounts the riding platform which act forces the blade into the ground when the weeder is started over the field and, as the blade comes in contact with the weeds the latter are severed at a point below the surface of the ground.

Now as the blade becomes foul with the cut weeds it will be cleaned by withdrawing the blade from the ground as above mentioned.

As hinted above there are two methods involved in cleaning the blade, the first by the use of a relatively strong spring that tends to advance the beam on the pivotal point as the weight is removed from the trailer, and thus to raise the blade out of the ground whether the team is or is not in motion; and the second method, by the use of a weaker spring, where pressure is exerted by backing the team against the pivotal point and thus pressing the blade backward and upward.

In the first method, with the team in motion, the blade will be reinserted in the ground at a point slightly in advance of its point of exit, and in the second method the pressure forces the weeder backward so that upon reinserting the blade the point of entrance is slightly back of the point of exit.

Now when the blade is foul the weeds are folded tightly against both sides of the blade, but in a manner to permit the blade to be withdrawn from between the folds and thus cleaned.

The weeds now on the blade will have a tendency to raise the blade above its normal elevation slightly and this with the backward motion of the weeder will position the blade so that upon reinsertion its cutting edge will pass below the lower fold of the weeds, and thus avoid the foul mass as the blade reenters the soil.

By thus entering the blade back of the original mass the action with regard to the surface of the ground is continuous and the raised portion of the soil that occurs slightly in advance of the blade during operation is now moved steadily along as if the blade had continued in the soil, and the surface of the soil is left as it was originally.

In turning corners, where the turn is made close to some obstacle such as a fence, that will prevent starting up again on clean ground, the operator may remain on the trailer, but will advance his weight to permit the light wood wheel to slide over the ground as the turn is made.

Where the turn is made without obstruction as where one of the wheels 6 may be backed around on clean ground, the operator may raise the blade out of the ground to prevent the light trailer wheel from dragging.

While a caster wheel would remove the necessity of dismounting in turning corners the light wood wheel 32 has been found to work satisfactorily as the flat surface of the wheel permits it to slide readily over the soft ground.

The dotted lines in Fig. 1 show the position of the tongue in turning and the relative position of the spring. The latter of which being attached to the end iron of the tongue at a distance from the king bolt will normally draw the tongue to a straight ahead position, and complementally will maintain the weeder in trace during operation.

Another effect is to keep the weight of the tongue off from the horses' necks, for as the spring is exerting a constant effort to raise the trailer off from the ground, the weight of the trailer counteracts this effect and provides a tendency to raise the tongue.

Having thus described my invention, I claim—

1. In a weeder, a horizontally supported beam carrying a cutting blade rigidly attached thereto for rotatable movement therewith, a draft means pivotally attached to the weeder below the center of said beam, a yielding means attached to said draft means, and to the center of said beam to normally rotate the beam about the pivotal point, and a trailer rigidly and adjustably attached to the beam to counteract the effect of said yielding means.

2. In a weeder, a horizontally supported beam carrying a cutting blade rigidly attached thereto for rotatable movement therewith, uprights rigidly attached to and extended above and below the center of said beam, a draft means pivotally attached to the lower end of said uprights, a yielding means attached to said draft means, and to the center of said beam in a manner to normally rotate said beam about the pivotal point, and a trailer rigidly and adjustably attached to said uprights to counteract the effect of said yielding means.

3. In a weeder, a horizontally supported beam carrying a cutting blade rigidly attached thereto for rotatable movement with said beam, uprights rigidly attached to and extended above and below the center of said beam, and having their lower ends advanced off center to provide a pivotal point, a draft means pivotally attached to said uprights at their pivotal point, a yielding means attached to said draft means, and to the beams in a manner to rotate said beam about the pivotal point, means to stop the rotation of said beam at a predetermined point, and a trailer rigidly and adjustably attached to said uprights to counteract the effect of said yielding means.

4. In a weeder, a horizontally and rotatably supported beam carrying a cutting blade rigidly attached thereto and rotatable therewith, a draft means pivotally attached to said weeder below the center of said beam to maintain the blade in the soil, and a trailer adjusting means attached to said weeder.

5. In a weeder, a horizontally and rotatably supported beam carrying a cutting blade rigidly attached thereto and rotatable therewith, a draft means pivotally attached to said weeder below the center of said beam to maintain the blade in the soil, a trailer adjusting means attached to said weeder, and means attached to said draft means to counterbalance said trailer.

In testimony whereof I affix my signature.

CLAUDE L. KEY.